(12) United States Patent
Bao et al.

(10) Patent No.: US 9,025,762 B2
(45) Date of Patent: May 5, 2015

(54) SYSTEM AND METHOD FOR CLOCK SYNCHRONIZATION OF ACOUSTIC ECHO CANCELLER (AEC) WITH DIFFERENT SAMPLING CLOCKS FOR SPEAKERS AND MICROPHONES

(71) Applicant: Cisco Technology, Inc., San Jose, CA (US)

(72) Inventors: Feng Bao, Sunnyvale, CA (US); J. William Mauchly, Berwyn, PA (US); Subrahmanyam Kunapuli, Fremont, CA (US); Xiangyu Bao, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 55 days.

(21) Appl. No.: 13/657,908

(22) Filed: Oct. 23, 2012

(65) Prior Publication Data
US 2014/0112466 A1    Apr. 24, 2014

(51) Int. Cl.
*H04M 9/08* (2006.01)
*H04R 1/28* (2006.01)

(52) U.S. Cl.
CPC .................................. *H04R 1/2869* (2013.01)

(58) Field of Classification Search
CPC ....... H04M 9/082; H04M 9/08; H04M 1/585; H04B 3/20; H04B 3/23; H04L 27/2662; H04L 27/2657; H04N 21/4382; H04J 3/0638; G10K 11/346; H03M 3/504; G06F 1/10
USPC .................. 379/406.01–406.16, 3, 391, 392; 455/570; 381/71.1–71.14; 370/286–292
See application file for complete search history.

(56) References Cited

U.S. PATENT DOCUMENTS

| | | | |
|---|---|---|---|
| 7,061,997 B1* | 6/2006 | Eberlein et al. | 375/332 |
| 7,352,776 B1* | 4/2008 | Hauptmann et al. | 370/493 |
| 2007/0047738 A1* | 3/2007 | Ballantyne et al. | 381/66 |
| 2007/0165838 A1* | 7/2007 | Li et al. | 379/406.01 |
| 2009/0185695 A1* | 7/2009 | Marton et al. | 381/66 |
| 2013/0044873 A1* | 2/2013 | Etter | 379/406.12 |
| 2013/0108076 A1* | 5/2013 | Chu et al. | 381/98 |

* cited by examiner

*Primary Examiner* — Akelaw Teshale
(74) *Attorney, Agent, or Firm* — Merchant & Gould

(57) ABSTRACT

Clock synchronization for an acoustic echo canceller (AEC) with a speaker and a microphone connected over a digital link may be provided. A clock difference may be estimated by analyzing the speaker signal and the microphone signal in the digital domain. The clock synchronization may be combined in both hardware and software. This synchronization may be performed in two stages, first with coarse synchronization in hardware, then fine synchronization in software with, for example, a re-sampler.

29 Claims, 12 Drawing Sheets

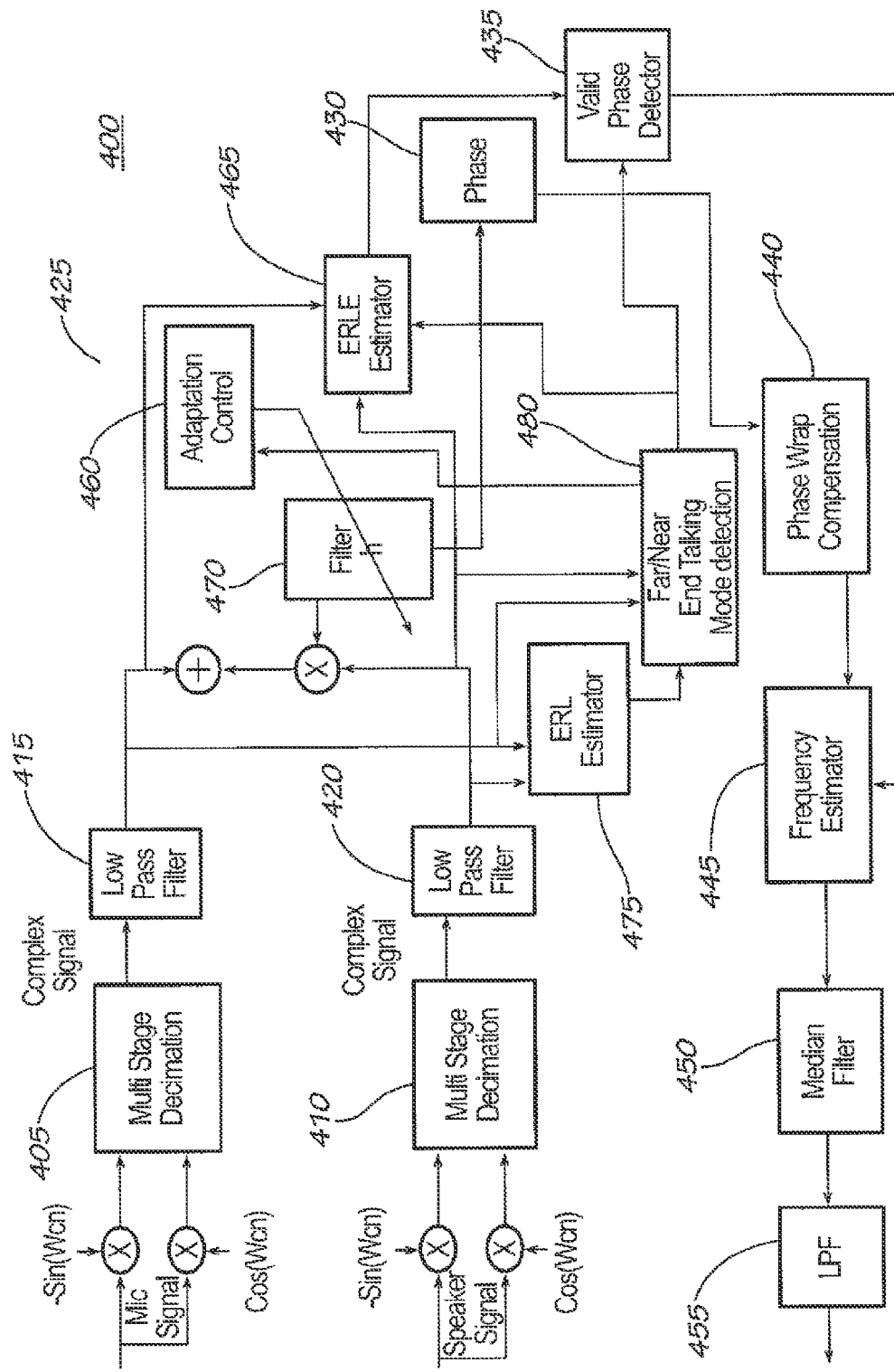

SYSTEM AND METHOD FOR CLOCK SYNCHRONIZATION OF ACOUSTIC ECHO CANCELLER (AEC) WITH DIFFERENT SAMPLING CLOCKS FOR SPEAKERS AND MICROPHONES

BACKGROUND

Echo cancellation is used in telephony to remove echo from a communication in order to improve voice quality on a call. In addition to improving subjective quality, echo cancellation increases the capacity achieved through silence suppression by preventing echo from traveling across a network. Two sources of echo are relevant in telephony: acoustic echo and hybrid echo. Echo cancellation involves first recognizing the originally transmitted signal that re-appears, with some delay, in the transmitted or received signal. Once the echo is recognized, it can be removed by 'subtracting' it from the transmitted or received signal.

BRIEF DESCRIPTION OF THE DRAWINGS

The accompanying drawings, which are incorporated in and constitute a part of this disclosure, illustrate various embodiments of the present disclosure. In the drawings:

FIG. 4 shows a coarse frequency difference estimation block diagram.

DETAILED DESCRIPTION

Overview

Figure 1:
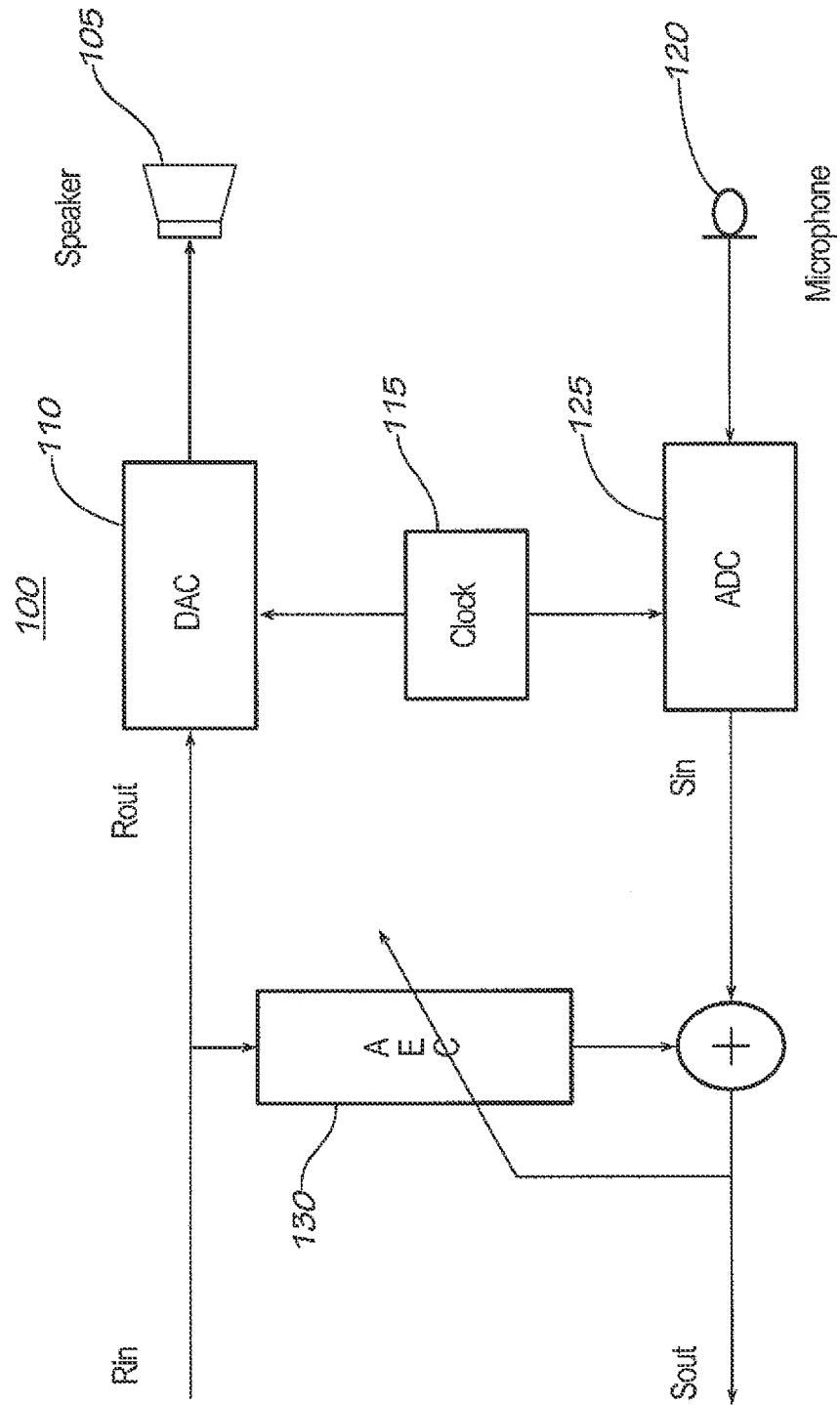
FIG. 1 shows an acoustic echo canceller (AEC) system.

Clock synchronization for an acoustic echo canceller (AEC) with a speaker and a microphone connected over a digital link may be provided. A clock difference may be estimated by analyzing the speaker signal and the microphone signal in the digital domain. The clock synchronization may be combined in both hardware and software. This synchronization may be performed in two stages, first with coarse synchronization (e.g., in hardware), then fine synchronization (e.g., in software) with, for example, a re-sampler. This clock synchronization may enable audio systems to use speakers and microphones connected over the digital link without any knowledge of the hardware clock information of the speakers, the microphones, or the digital link.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FIG. 1 shows an acoustic echo canceller (AEC) system 100. As shown in FIG. 1, system 100 may comprise a speaker 105, a digital-to-analog converter (DAC) 110, a clock 115, a microphone 120, an analog-to-digital converter (ADC) 125, and an AEC 130. Speaker 105 and microphone 120 may have the same sampling rates, in other words, same clock 115 source may be used for ADC 125 for microphone signals and DAC 110 for speaker signals. AEC 130 may be used, for example, in teleconferencing systems, to cancel an echo of signals emitted on speaker 105 from a signal from microphone 120.

Figure 2A:
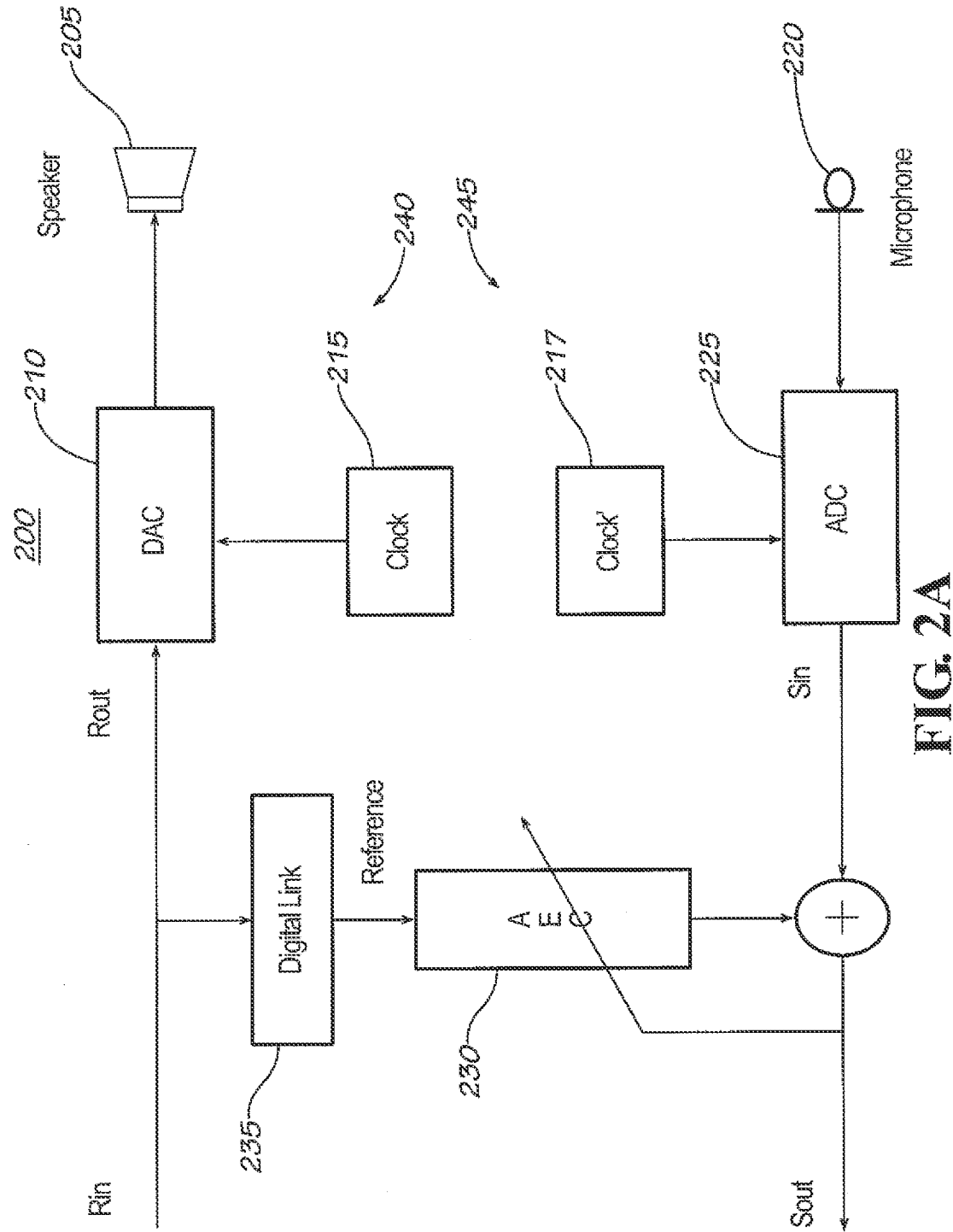
FIG. 2A shows an AEC system.
Figure 2B:
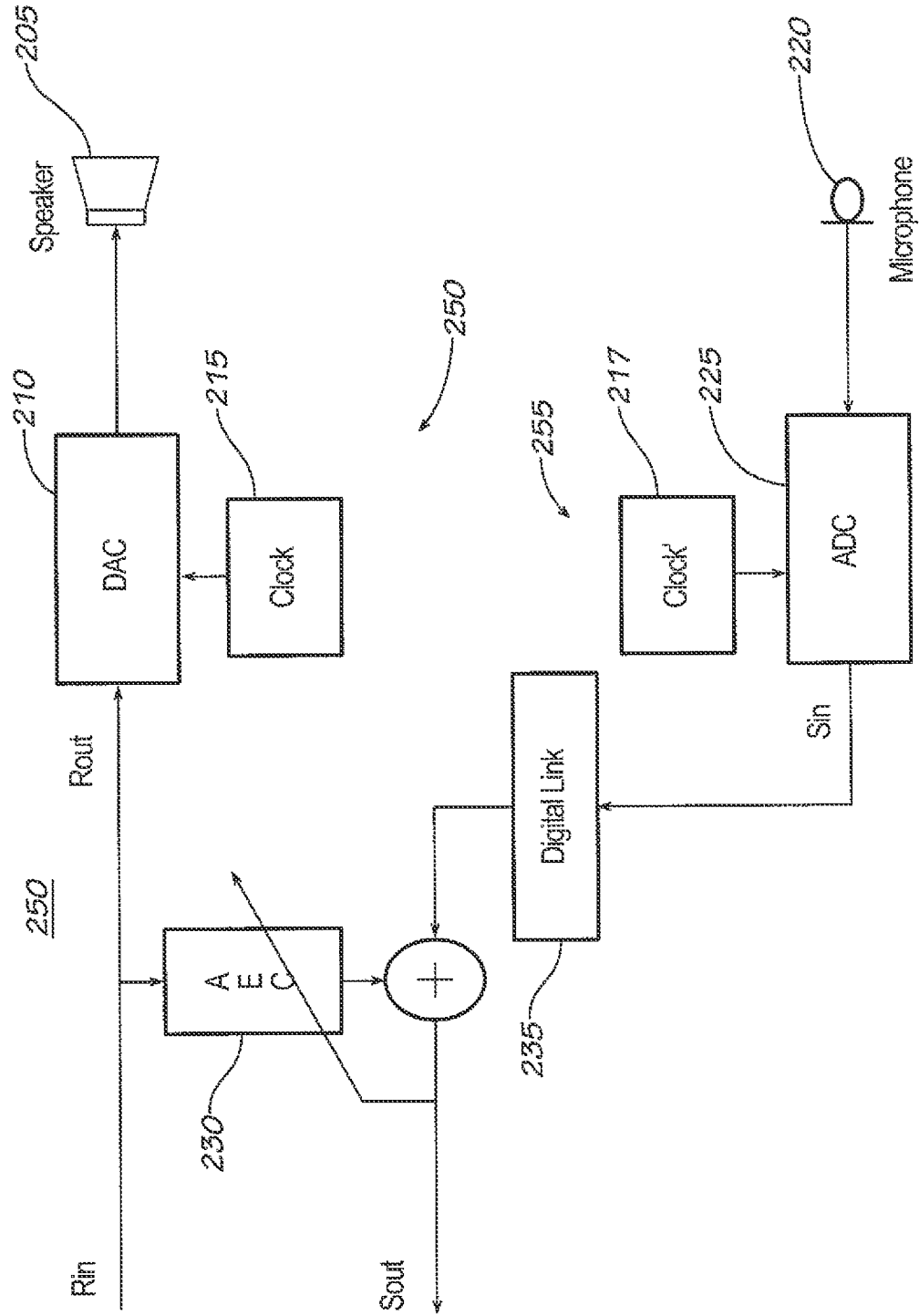
FIG. 2B shows an AEC system.

FIG. 2A shows an acoustic echo canceller (AEC) system 200. As shown in FIG. 2A, system 200 may comprise a speaker 205, a digital-to-analog converter (DAC) 210, a first clock 215, a second clock 217, a microphone 220, an analog-to-digital converter (ADC) 225, and an AEC 230. As shown in FIG. 2A, a digital link 235 may connect a speaker portion 240 of system 200 with a microphone portion 245 of system 200. Speaker portion 240 and microphone portion 245 may have their own clocks, for example, first clock 215 and second clock 217 respectively. As shown in FIG. 2A, AEC 230 may be disposed in microphone portion 245. FIG. 2B shows an AEC system 250 (similar to system 200) having a speaker portion 250 and a microphone portion 255. As shown in FIG. 2B, AEC 230 may be disposed in speaker portion 250.

With advances in digital technology, more and more digital links (e.g., digital link 235) may be used in audio systems (e.g., system 200 and system 250). Consequently, it may be desirable to have speakers (e.g., speaker 205) and microphones (e.g., microphone 220) in different clock domains, and connected by a digital link (e.g., digital link 235), for example, USB or Ethernet as shown in FIG. 2A and FIG. 2B.

With different clocks (e.g., first clock 215 and second clock 217) driving DAC 210 and ADC 225 respectively, an adaptive filter in AEC 230 may not only model the acoustic echo path, but also the accumulated clock phase difference between first clock 215 and second clock 217. An adaptive filter for echo cancellation may cover 100 ms of acoustic echo path and may be able to tolerate up to 20 ppm of clock difference while crystals used in audio systems usually are about ±100-300 ppm. For AEC 230 to work properly, the difference in first clock 215 and second clock 217 may need to be small, which is not the case with conventional commercial crystals in conventional audio systems.

An adaptive filter, in a conventional AEC, models room acoustic path and subtracts a replica of the echo generated by the model from the microphone signal. With different sampling clocks for the speaker and microphone signals, the adaptive filter in conventional systems not only has to model room acoustic path, but also the drifting clock phase difference. If the clock difference is big, the adaptive filter in conventional systems may not be able to converge due to the rapid changes in the phase of correlation between the speaker and microphone signals.

For an adaptive filter to work properly, the convergence speed of the adaptive filter should be much faster than the accumulated phase drift that is caused by the difference in sampling clocks. Step size of adaptation of an adaptive filter may be inversely proportional to the filter length. Adaptive filter length has to be long enough to cover room acoustic echo path. However, the clock difference between normal commercial crystals is much greater than a conventional AEC can tolerate. Consequently, to make AEC work, sampling clocks of the speaker and the microphone should be synchronized.

Clock synchronization may be achieved either in hardware by adjusting frequency of the clocks, or in software by applying a re-sampler to either the speaker or microphone signal. Due to the limited adjustable range of clocks, hardware only synchronization may not be able to reduce clock difference to a satisfactory level. On the other hand, software only synchronization may only be able to deal with arbitrary clock differences. But, when clocks differ too much, due, for example, to the asynchronous timing between microphone and speaker systems, data loss and variations in data alignment between the systems may degrade AEC performance.

Figure 3A:
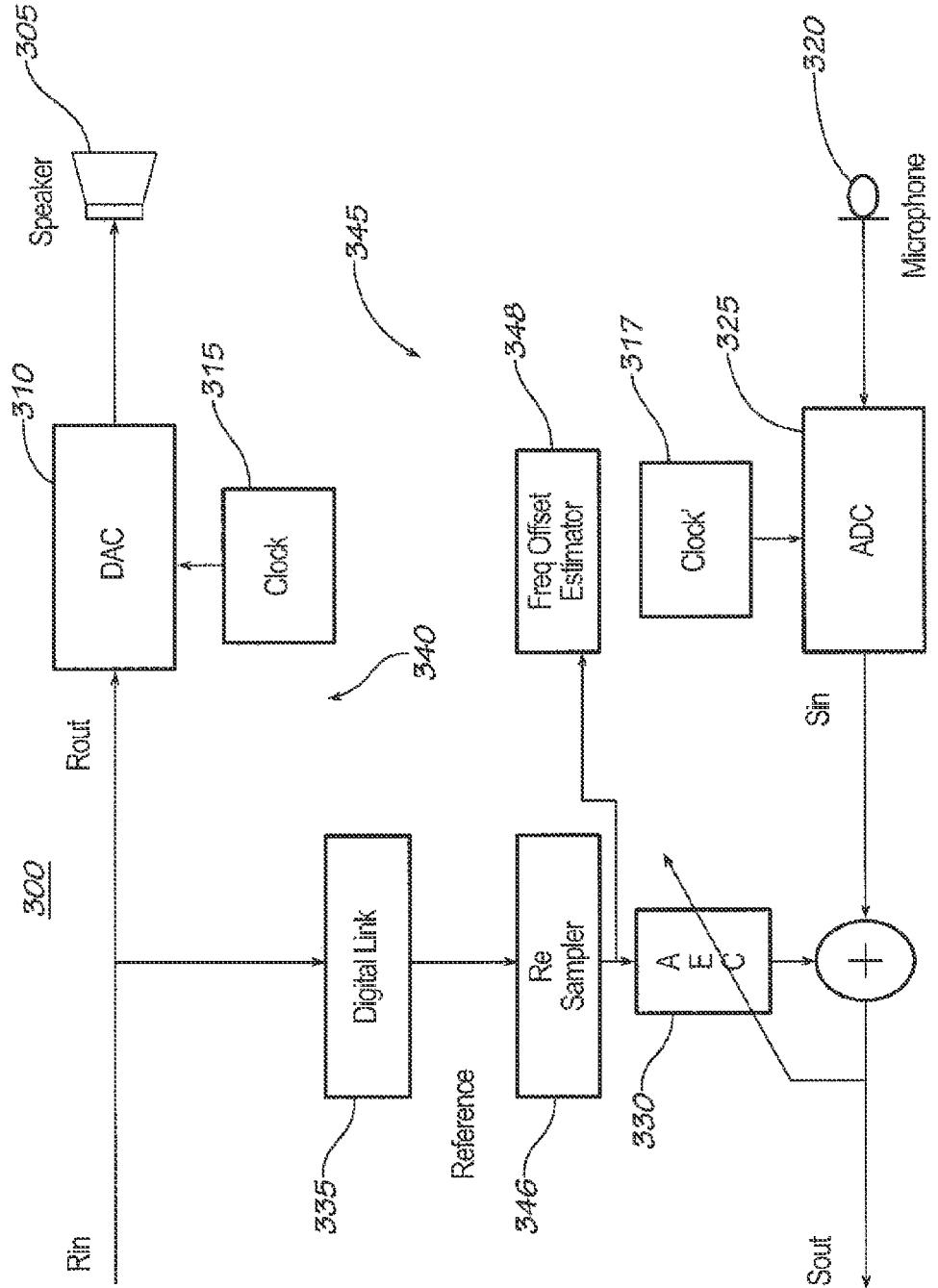
FIG. 3A shows an AEC system with two stage clock synchronization.
Figure 3B:
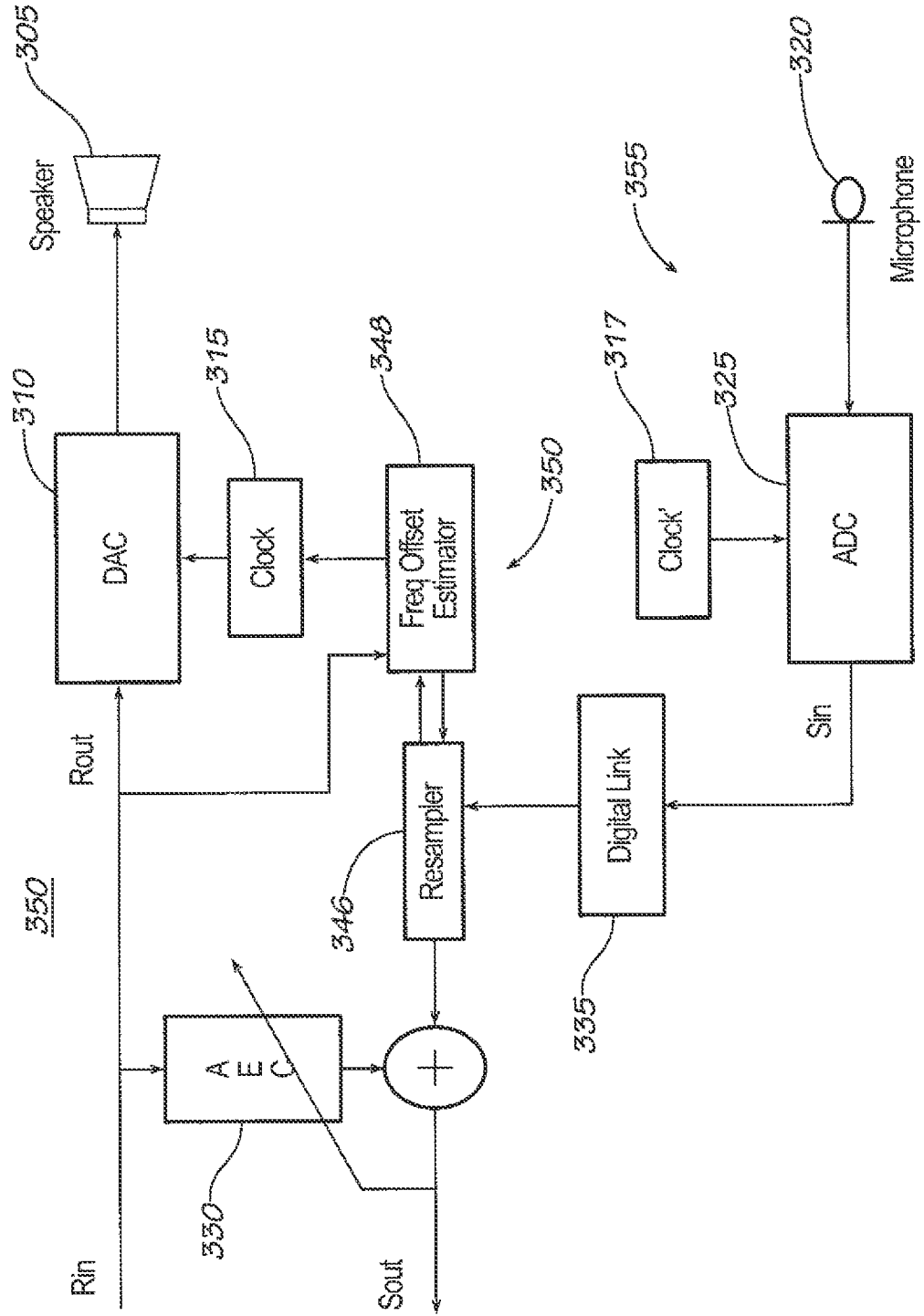
FIG. 3B shows an AEC system with two stage clock synchronization.

FIG. 3A shows an AEC system 300 consistent with embodiments of the disclosure. As shown in FIG. 3A, system 300 may comprise a speaker 305, a DAC 310, a first clock 315, a second clock 317, a microphone 320, an ADC 325, and an AEC 330. System 300 may further comprise a re-sampler 346 and a frequency offset estimator 348. As shown in FIG. 3A, a digital link 335 may connect a speaker portion 340 of system 300 with a microphone portion 345 of system 300. Speaker portion 340 and microphone portion 345 may have their own clocks, for example, first clock 315 and second clock 317 respectively. As shown in FIG. 3A, AEC 330, re-sampler 346, and frequency offset estimator 348 may be disposed in microphone portion 345. FIG. 3B shows an AEC system 350 (similar to system 300) having a speaker portion 350 and a microphone portion 355. As shown in FIG. 3B, AEC 330, re-sampler 346, and frequency offset estimator 348 may be disposed in speaker portion 350.

FIG. 3A and FIG. 3B show AEC systems (e.g., system 300 and system 350 respectively) with two stage clock synchronization consistent with embodiments of the disclosure. The optimized approach of FIG. 3A and FIG. 3B may be to combine clock synchronization in both hardware and software, and synchronizing clocks (e.g., first clock 315 and second clock 317) in two stages, first with a coarse synchronization in hardware, then a fine synchronization in software with re-sampler 346, for example.

Consistent with embodiments of the disclosure, the clock difference (e.g., between first clock 315 and second clock 317) can be estimated with analysis of speaker 305's and microphone 320's signals without any knowledge of digital link 335 or clock information from either speaker 305 or microphone 320 systems.

Assume that the sampling period of speaker 305's signal is $T+\Delta T$, and microphone 320's signal is T, then:
digitized speaker 305's signal is: $r(i)=r(t)*\Sigma\delta(t-iT-i\Delta T)$
while microphone 320's signal is: $s(i)=s(t)*\Sigma\delta(t-iT)$
where $\delta(t)$ is Dirac function, r(t) is analog speaker 305's signal, s(t) is microphone 320's signal, and s(t) is convolution of r(t) and acoustic echo path h(t); $s(t)=r(t)*h(t)$
In frequency domain $S(w)=H(w)*R(w)$
The Fourier transform of r(i) is:

$$R(e^{j\alpha\omega}) = R(e^{j\omega+j\beta\omega}),$$

where $$\alpha = \frac{T+\Delta T}{T} = 1+\beta$$

In AECs consistent with the disclosure, an adaptive filter may use correlation between s(i) and r(i) to estimate acoustic echo path, but due to sampling clock difference, the adaptive filter gets $R(e^{j\alpha\omega})*H(e^{j\omega})$ instead $R(e^{j\omega})*H(e^{j\omega})$. This may be equivalent to the reference signal getting stretched by a small amount in the frequency domain.

For a specific frequency $\omega_c$, correlation between speaker 305's and microphone 320's signal in the frequency domain is:

$$\|R(e^{j\alpha\omega_c})*H(e^{j\omega_c})\|*e^{j(\beta\omega_c*i+\theta)}, i=0,1,\ldots$$

Where $\theta$ is a random phase.
When $\Delta T$ is small enough, $$\|R(e^{j\alpha\omega_c})\| \approx \|R(e^{j\omega_c})\|$$

Then the clock difference (e.g., between first clock 315 and second clock 317) may cause a phase rotation $e^{j(\beta\omega_c*i)}$, i=0, 1, ... in correlation. The clock difference may be estimated by measuring this phase rotation.

FIG. 4 shows a coarse frequency difference estimation block diagram 400. Diagram 400 may include a first multi stage decimator 405, a second multi stage decimator 410, a first low pass filter 415, a second low pass filter 420, an adaptive filter 425, a phase estimator 430, a valid phase detector 435, phase wrap compensation 440, a frequency estimator 445, a median filter 450, and a third low pass filter 455. Adaptive filter 425 may comprise adaptation control 460, echo return loss enhancement (ERLE) estimator 465, a filter (h) 470, an echo return loss (ERL) estimator 475, and a far/near end talking mode detector 480.

As illustrated in FIG. 4, coarse frequency estimation can be done on one or two frequency components of speaker 305's and microphone 320's signals. First, speaker 305's and microphone 302' signals may be demodulated with a chosen frequency $\omega_c$. Then multi stage decimation filters (e.g., first multi stage decimator 405 and second multi stage decimator 410) may be applied to the demodulated signals. Low pass filters (e.g., first low pass filter 415, a second low pass filter 420) may be applied to the down sampled signals to reduce its bandwidth further.

A one tap adaptive filter (e.g., adaptive filter 425) may be implemented to model the audio path and accumulated phase rotation on the frequency $\omega_c$.

$$h_{n+1}=h_n+\mu*err*r_n,$$

$$err=h_n*r_n-s_r,$$

where $h_n$ is the filter coefficient at time n, $\mu$ is the step size of adaptation, err is the error signal between filter output $h_n * r_n$ and demodulated and down sampled microphone signal $s_n$, $r_n$ is the demodulated and down sampled speaker signal.

Since the adaptive filter 425 may have only one tap, it may converge even when the equivalent audio path is changing fast due to the clock difference.

Adaptation control 460 may monitor the behavior and control the adaptation of adaptive filter 425. ERLE estimator 465 may compare speaker and microphone signal power to estimate echo return loss. Far/near end talking mode detector 480 may use estimated echo return loss and speaker, microphone signal powers to control adaptation of adaptive filter 425. After ERLE estimator 465 decides that adaptive filter 425 has converged and its echo return loss enhancement of filter 470 is above a predefined threshold, and when far/near end talking mode detector 480 decides there is a strong speaker signal and echo, but low level of near end interference, valid phase detector 435 may mark the current phase of the filter coefficient as valid for the frequency estimation. Since the phase wraps around when it rolls over $-\pi$ or $\pi$, phase wrap has to be compensated by phase wrap compensation 440 before it is used for frequency estimation.

In a predefined time interval P, if the number of valid phase data N is above a predefined threshold $N_p$, frequency estimator 445 estimates a sampling frequency difference between speaker 305's and microphone 320's signals based on wrap around compensated phase rotation of the filter coefficient.

Frequency estimation minimizes error of $$\|\Sigma_{i=0}^{L-1}(\tilde{\Delta}f * i + D - p(i))^2\|, i \in I$$

where i is time, p(i) is the valid phase data, I is the group of time index which has valid phase data, L is the total number of valid phase data, D is a constant offset, and $\tilde{\Delta}f$ is an estimated frequency offset.

To make frequency estimation more reliable, two different frequency components of speaker 305's and microphone 320's signals may be used. The results of two estimated frequency differences may be cross checked with each other in each estimation period. Median filter 450 may be applied to the estimated frequency differences to increase reliability of the final estimation. The output of median filter 450 may be passed through third low pass filter 455.

With possible large clock differences, $\omega_c$ may be chosen at a frequency that has strong speaker signal component, and relatively in low frequency range to allow faster phase rotation. $\omega_c$ between 300 to 800 Hz may be chosen.

Figure 5:
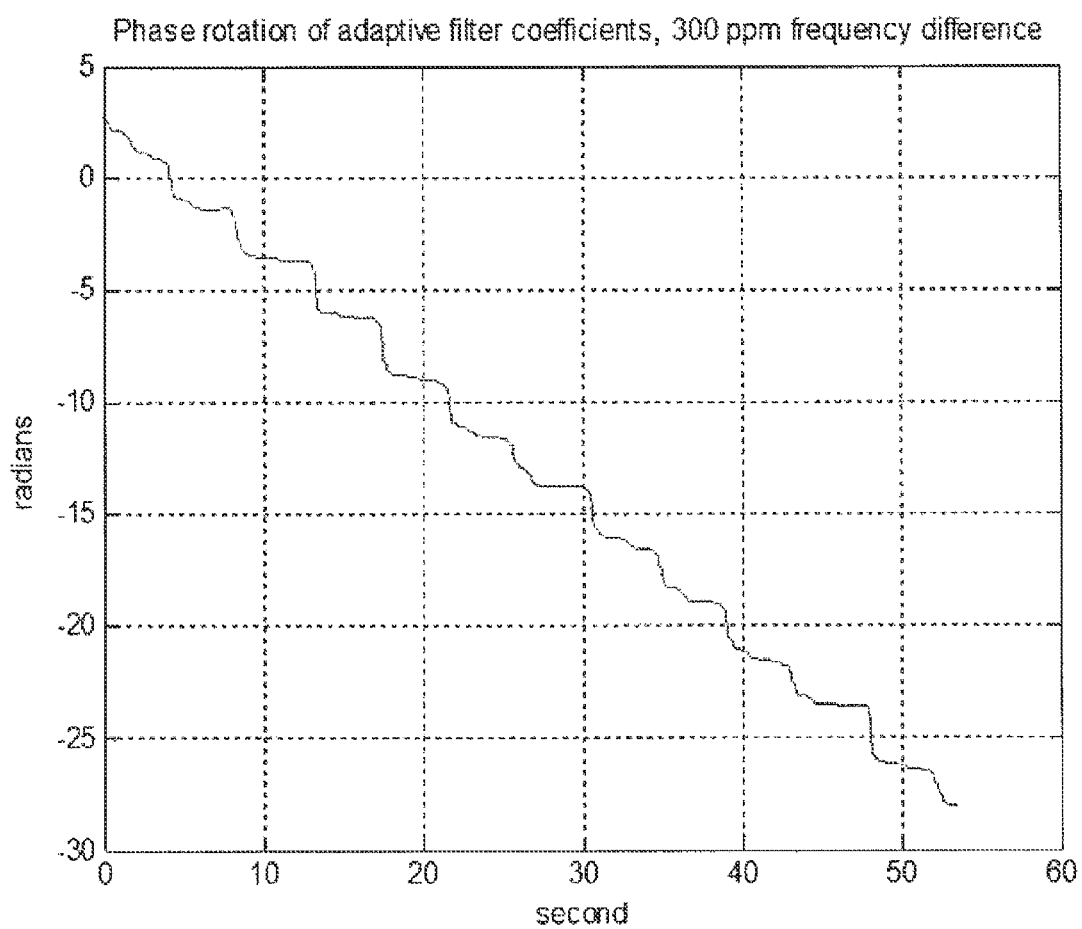
FIG. 5 shows phase rotation of adaptive filter coefficients.

Decimation filters (e.g., first multi stage decimator 405 and second multi stage decimator 410) may be used to reduce computation requirement of the coarse frequency estimation. Sampling rate after the decimation filter may be in the range of 10 times expected maximum frequency difference. If the expected clock differences are, for example, in the range of <300 ppm, $\omega_c$ is 300 Hz, then the expected frequency difference is $300*300*10^{-6}=0.09$ Hz. The sampling rate after the decimation filter may be in the range of 1-2 Hz. The bandwidth of third low pass filter 455 should be smaller than the expected maximum frequency difference. FIG. 5 shows phase rotation of adaptive filter coefficients.

Time interval P may allow a phase rotation of at least $2\pi$ at the expected maximum frequency difference. With the expected frequency difference of 0.09 Hz, P may be longer than 10 seconds for example. To avoid phase rotations of more than $2\pi$ when there are no valid phase data, the longest period within P that does not have valid phase data should not exceed the time it takes for a phase rotation of $2\pi$.

ERLE 465 may compares decimated microphone signal power before and after the adaptive filter and may use a fast down, slow up low pass filter to smooth out the results. ERL 475 may be a fast down, slow up low pass filter applied to the ratio of power of decimated speaker and microphone signals. Far/near end talking mode detector 480 may estimate power of echo signal based on power of decimated speaker signal and estimated echo return loss, compares estimated echo power and power of decimated microphone signal to estimate how strong the near end speech signal at microphone is. Far/near end talking mode detector 480 may control adaptation of filter (h) 470.

The result of the coarse frequency estimation (e.g., as discussed above with respect to FIG. 4) may be used to synchronize speaker and microphone clocks (e.g., clock 315 and clock 317) in hardware. However, due to adjustable range limitations of hardware clocks, there may be a residual clock frequency difference after coarse frequency synchronization.

Figure 6:
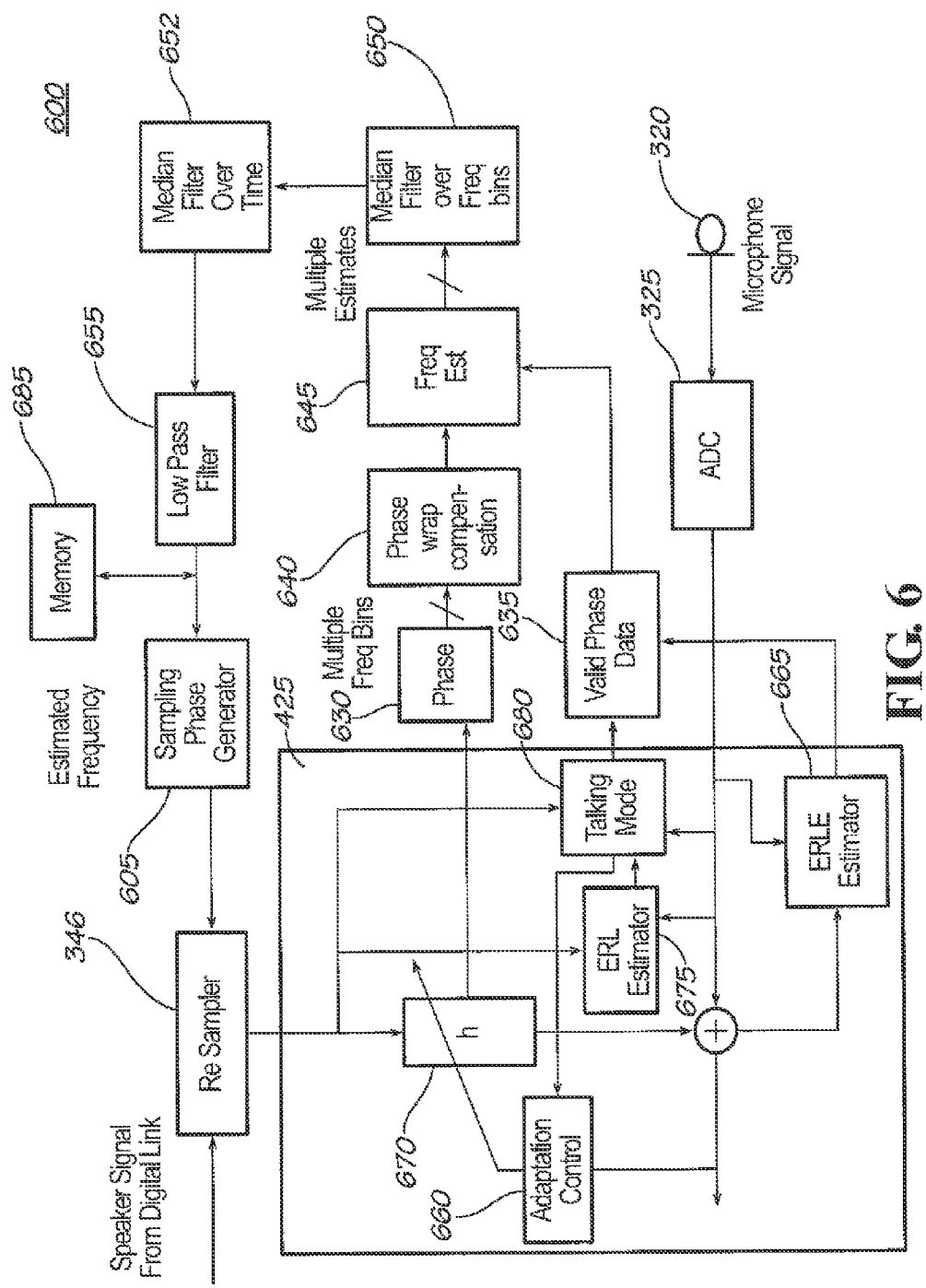
FIG. 6 shows a frequency difference estimation block diagram.

FIG. 6 shows a frequency difference estimation block diagram 600. Diagram 600 may include re-sampler 346, adaptive filter 425, a sampling phase generator 605, a phase estimator 630, a valid phase detector 635, a phase wrap compensation 640, a frequency estimator 645, a median filter over frequency bins 650, median filter over time 652, and a low pass filter 655. Adaptive filter 425 may comprise adaptation control 660, echo return loss enhancement (ERLE) estimator 665, a filter (h) 670, an echo return loss (ERL) estimator 675, and a far/near end talking mode detector 680.

The residual clock frequency difference can be compensated with software re-sampler 346. Fine frequency estimation may track the residue clock difference. Sampling phase generator 605 may generate a sampling phase for re-sampler 346 based, for example, on the estimated frequency. Re-sampler 346 may use a Farrow structure to calculate output samples at an arbitrary sampling phase.

After coarse frequency adjustment in hardware, adaptive filter 425 (e.g., in AEC 330) may be able to converge with degraded performance of echo return loss enhancement due to the residual clock frequency difference. Fine frequency estimation may monitor the phase rotation of adaptive filter coefficients in AEC 330, and may estimate frequency difference with phase rotation over time.

If AEC 330 uses a frequency domain adaptive filter (e.g., filter (h) 670), fine frequency estimation may monitor frequency bins of the filter. If AEC 330 uses sub-band adaptive filter (e.g., filter (h) 670), a Fourier transform may be applied to the filter coefficients in a sub-band to get a frequency domain representation of the filter coefficients in that sub-band. As a result, fine frequency estimation may monitor the phase rotation of the frequency domain representation of the filter coefficients. Bandwidth of each frequency bin may be narrow enough, for example, less than 100 Hz.

Figure 7:
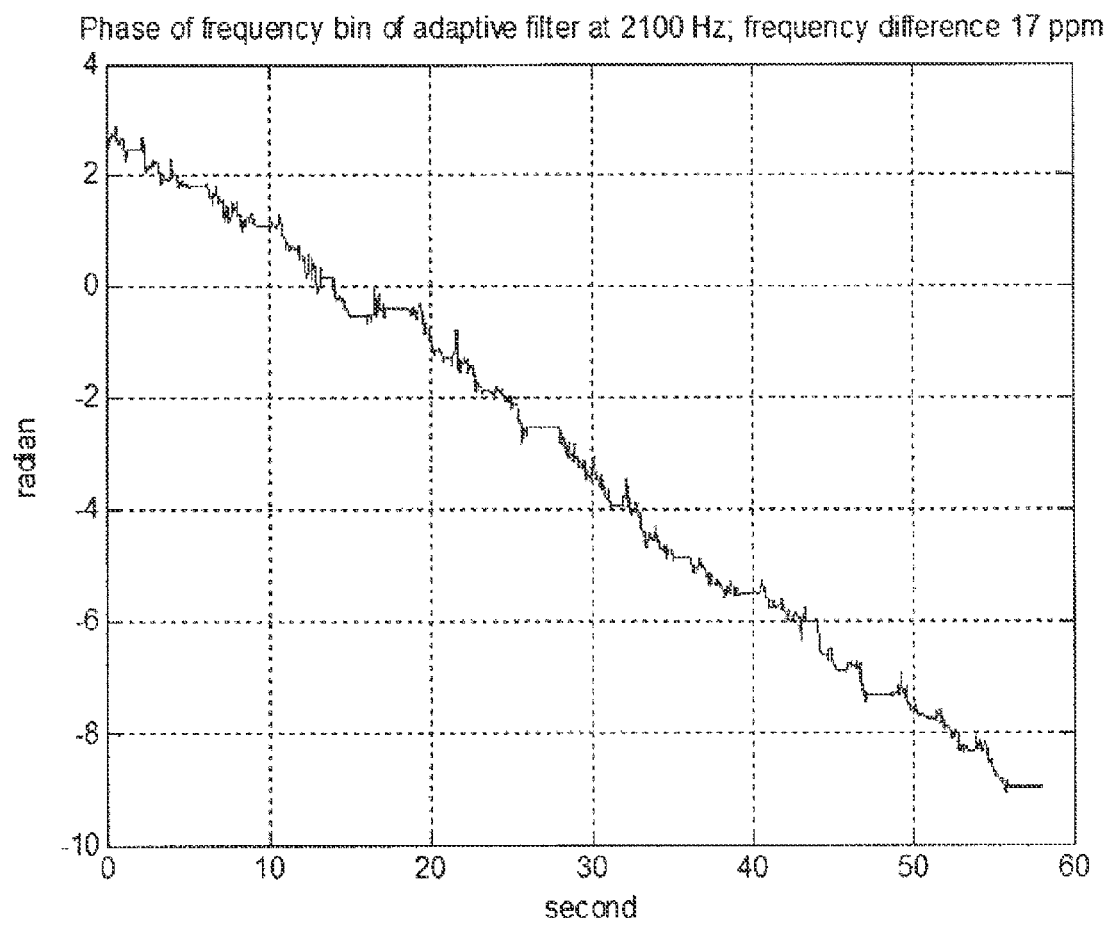
FIG. 7 shows phase of frequency bin of adaptive filter at 2,100 hz.

With smaller frequency difference due to coarse clock synchronization, fine estimation of frequency may use frequency bins with higher frequencies to observe faster phase rotation. For example, frequencies from 1000 to 2500 Hz may be good candidates. FIG. 7 shows phase of frequency bin of adaptive filter at 2,100 hz.

Time period for fine frequency estimation P may allow phase rotation of at least 7 for the lowest frequency used. The longest period within P that does not have valid phase data may not exceed the time it takes for a phase rotation of $2\pi$ for highest frequency used in fine estimation.

Adaptive filter 425 may have its own ERL estimator 675, talking mode detection 680, and ERLE estimator 665 that can be used for fine frequency estimation. To improve reliability of fine frequency estimation, multiple frequency bins with high magnitude and wide frequency differences may be used. Which frequency bins are used for frequency estimation can be changed dynamically during a call depends on which frequency bin has higher magnitude. 3 to 5 frequency bins may be used for fine frequency estimation. Median filter 650 may be applied to estimated frequency differences for multiple bins to get one estimation result. Another median filter over time 652 may be applied to estimation result to make sure sudden change in acoustic echo path does not interfere with frequency estimation result. The output of median filter over time 652 may be smoothed over time by low pass filter 655 to get final estimation.

For each pair of speaker and microphone clocks (e.g., first clock 315 and second clock 317), the frequency difference may be very stable over time.

Estimated frequency by both coarse and fine estimation may be written to a memory 685 after each conference call, and to be used as initial value for a next call.

Figure 8A:
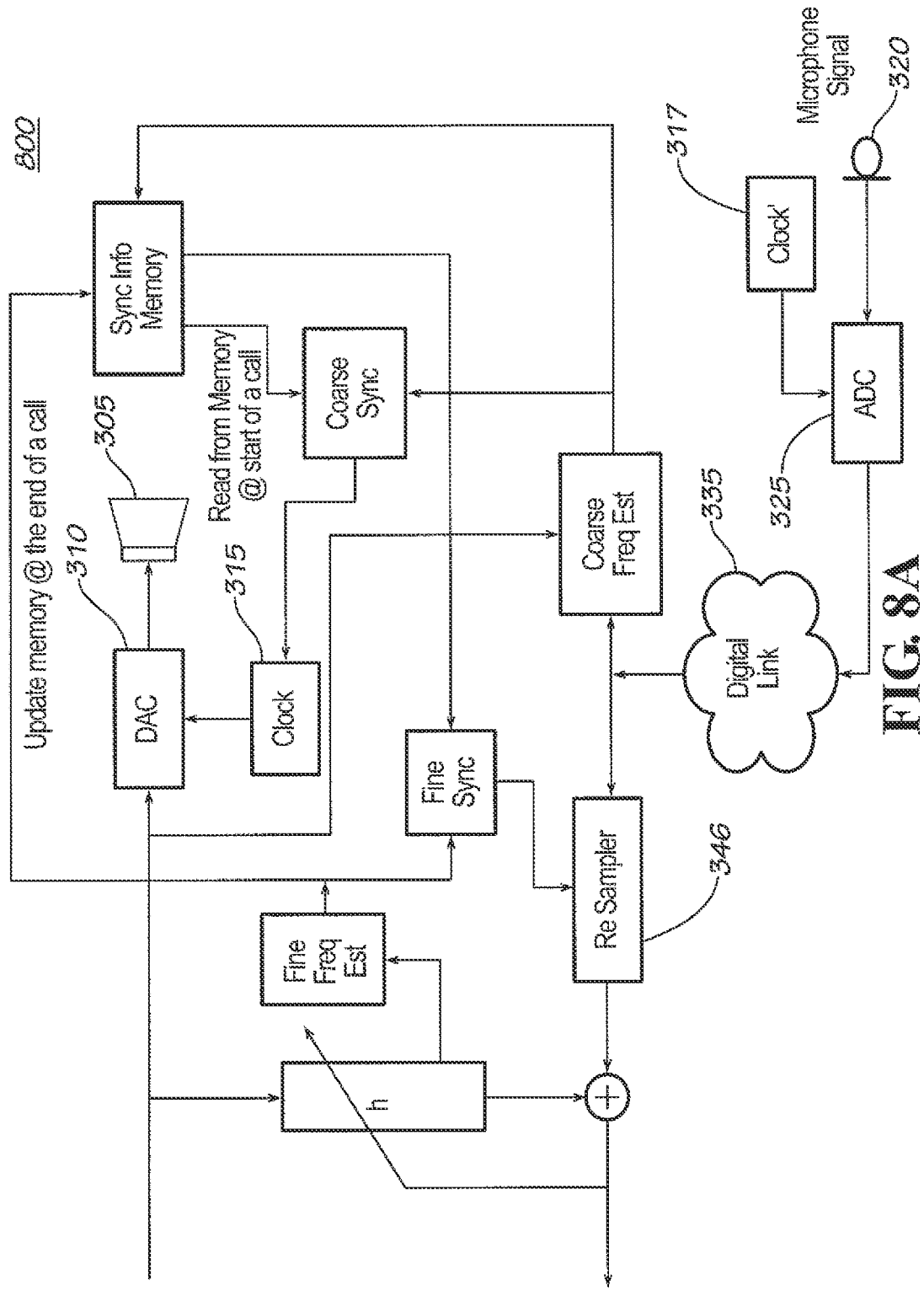
FIG. 8A shows a clock difference estimation and initialization block diagram when a microphone is connected over a digital link.
Figure 8B:
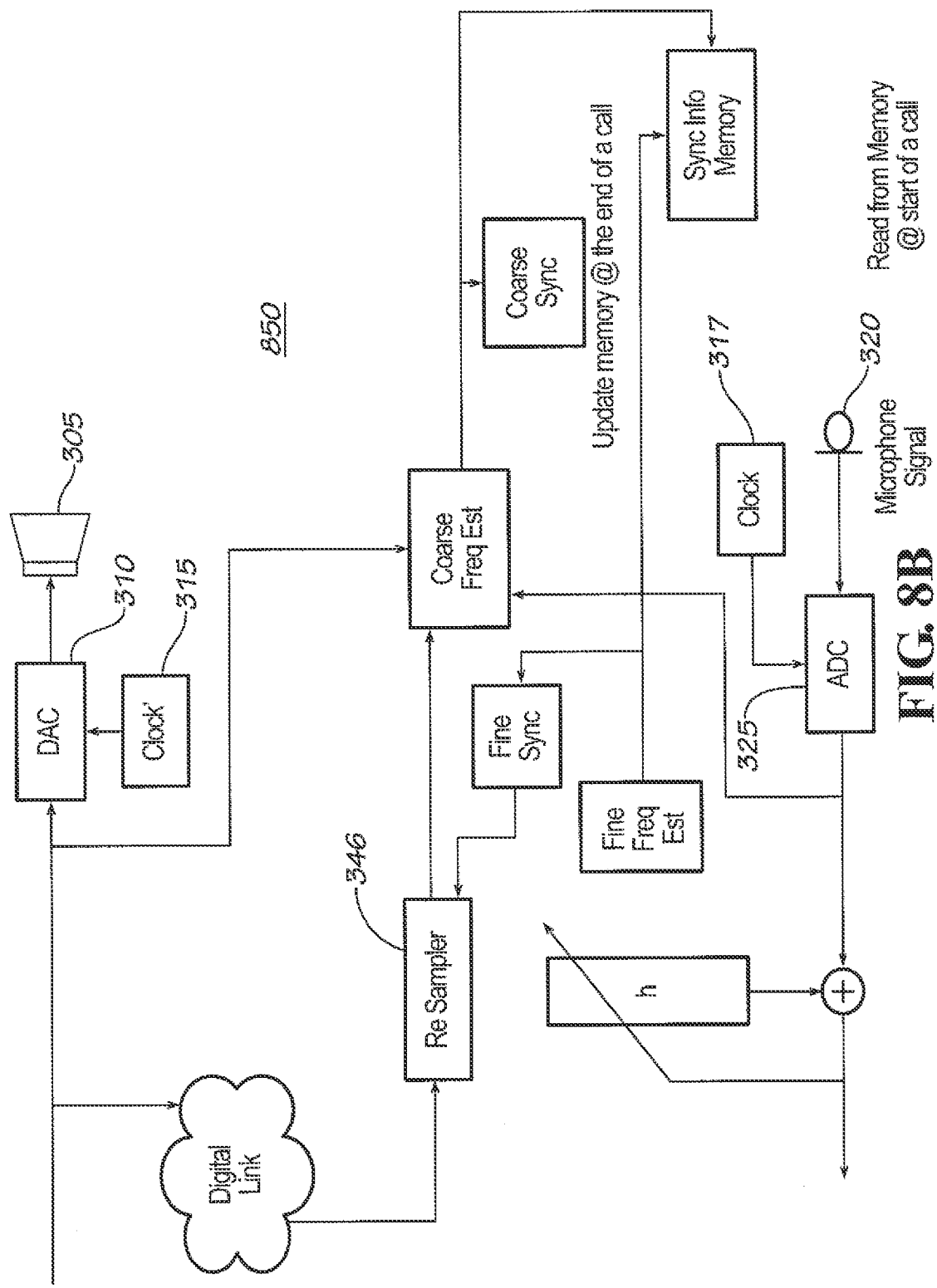
FIG. 8B shows a clock difference estimation and initialization block diagram when a speaker is connected over a digital link.

FIG. 8A shows a clock difference estimation and initialization block diagram 800 when microphone 320 is connected over digital link 335. FIG. 8B shows a clock difference estimation and initialization block diagram 850 when speaker 305 is connected over digital link 335.

Figure 9:
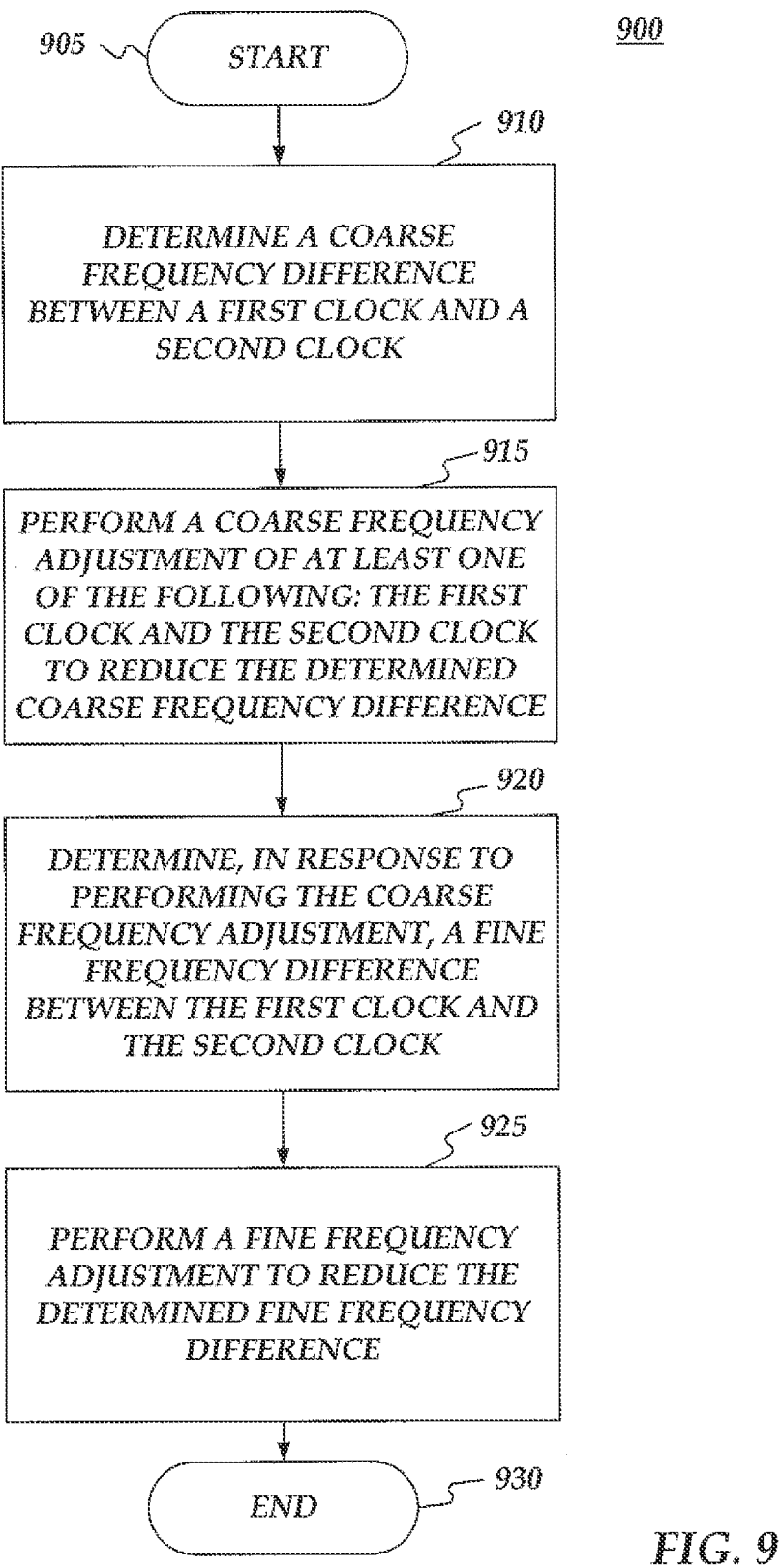
FIG. 9 is a flow chart of a method for providing synchronization of an AEC with different sampling clocks.

FIG. 9 is a flow chart setting forth the general stages involved in a method 900 consistent with an embodiment of the disclosure for providing synchronization of an AEC with different sampling clocks. Method 900 may be implemented using systems described in block diagram 400 and block diagram 600 described in more detail above with respect to FIG. 4 and FIG. 6. Ways to implement the stages of method 900 will be described in greater detail below.

Method 900 may begin at starting block 905 and proceed to stage 910 where a coarse frequency difference between first clock 315 and second clock 317 may be determined. For example, speaker 305's and microphone 320's signals may be demodulated to a predefined frequency, then down sampled, and low pass filtered to generate inputs of adaptive filter 425. ERLE estimator 465 monitors ERLE of the filter 470. ERLE estimator 465 compares the power of the decimated microphone signal before and after the adaptive filter, and may use a fast down, slow up low pass filter to smooth out the results. Phase rotation data may only be valid when ERLE is above a predefined threshold.

As shown in FIG. 4, ERLE 465 estimates echo return loss and reports it to talking mode detector 480. ERL estimator 475 may comprise a fast down, slow up low pass filter applied to ratio of power of decimated speaker and microphone signal. Talking mode detector 480 may decide current mode is in near end microphone signal mode or far end speaker/echo signal mode. Phase data of the filter may only be valid in far end speaker/echo signal mode. Phase data has to be compensated for possible phase wrap of ($\pm 2\pi$) before used for frequency estimation. In a time interval P, which should at least allow phase rotation of ($\pm 2\pi$) at maximum possible frequency difference, frequency estimation may be calculated when number of valid phase data exceeds a predefine threshold.

For maximum possible frequency difference, assume $P_{2\pi}$ is the time it takes for phase to rotate $2\pi$. To avoid phase ambiguity, the longest period within P that does not have valid phase data should not exceed $P_{2\pi}$. When both of the aforementioned conditions are satisfied for the time interval P, frequency estimation may start. Minimum mean squire error (MMSE) method may be used to estimate frequency difference with valid phase data.

Multiple one tap adaptive filters can be used at different frequencies to increase reliability of frequency estimation. When multiple frequencies are used, the results of frequency estimation should be cross checked against each other. If the difference between estimations at different frequencies is big enough, then the estimation is invalid. A median filter may be applied to the result of frequency estimation. Low pass filter 455 may be applied to the output of median filter 445.

From stage 910, where the coarse frequency difference between first clock 315 and second clock 317 was determined, method 900 may advance to stage 920 where a coarse frequency adjustment of first clock 315, second clock 317, or both may be performed to reduce the determined coarse frequency difference. For example, coarse estimation result may be written to a memory after, for example, a conference call finishes. Stored coarse frequency estimation result from the last call may be used when initiating a new call. The result of coarse frequency estimation may be written to a control register of adjustable clock to change its clock frequency.

For a pair of speaker DAC 310 and microphone ADC 325, the relative clock difference may change very slowly over time. When the very first coarse frequency estimation is available, the control register of clock is written and speaker DAC and microphone ADC clocks (e.g., first clock 315 and second clock 317) may be synchronized, adaptive filter in AEC should converge. If adaptive filter in AEC does converge after coarse synchronization, the coarse frequency estimation result should be claimed as valid. If difference between new estimation $\tilde{\Delta}f_n$ and previous valid estimation $\tilde{\Delta}f_v$ is bigger than a predefined threshold $D_f$, then new estimation should be capped as $\tilde{\Delta}f_v + D_f$. After coarse clock synchronization the applied clock adjustment and adaptive filter in AEC converges properly, fine frequency estimation may begin.

Once the coarse frequency adjustment is performed in stage 920, method 900 may continue to stage 930 where, in response to performing the coarse frequency adjustment, a fine frequency difference may be determined between first clock 315 and second clock 317. For example, if AEC adaptive filter 425 is implemented in the frequency domain, phase rotation of filter coefficients should be used for fine frequency difference estimation. If adaptive filter 425 is sub-band based, a Fourier transform applied to filter coefficients in certain sub-bands may provide the equivalent frequency domain representation. Phase rotation of equivalent frequency bins may be used for frequency difference estimation.

Multiple frequency bins in adaptive filter may be used in fine frequency difference estimation to improve reliability of the estimation. Which frequency bins are used for fine frequency estimation can be changed dynamically during, for example, a call. Frequency bins with high magnitude may be chosen. Echo return loss estimation, echo return loss enhancement estimation, and talking mode detection in AEC may be used to decide validity of phases of frequency bins for frequency estimation.

Time interval P may be chosen to allow phase rotation of at least ($\pm \pi/2$) for the lowest frequency bin used in the estimation at the maximum possible frequency difference. Frequency estimation may be calculated only when the number of valid phase data exceeds a predefine threshold. For the maximum possible frequency difference, assume $P_{2\pi}$ is the time it takes for phase of highest frequency bin to rotate $2\pi$. To avoid phase ambiguity, the longest period within P that does not have valid phase data should not exceed $P_{2\pi}$. For time interval P, when both of the aforementioned conditions are satisfied, fine frequency estimation may start. Minimum mean squire error (MMSE) method maybe used to estimate frequency difference with valid phase data.

Median filter 650 may be applied to the results of fine frequency estimation from multiple frequency bins to get one estimated frequency difference. Another median filter 652 may be applied to the estimated frequency difference data to eliminate estimations that are affected by acoustic echo path changes. A simple one pole low pass filter (e.g., low pass filter 655) may be applied to the output of median filter 652 to get final fine estimated frequency difference.

Re-sampler 346 may adjust sampling rate of speaker 305's or microphone 320's signal. After re-sampler 346, the clock difference becomes smaller, and so does the new fine frequency difference estimation. The final speaker/microphone clock frequency difference estimation $\tilde{\Delta}f_f$ may be an accumulation of fine frequency difference estimations $\tilde{\Delta}f_{fe}$. At time n, when a new estimation $\tilde{\Delta}f_{fe,n}$ is available, speaker/microphone clock frequency difference estimation $\tilde{\Delta}f_f$ is updated as:

$$\tilde{\Delta}f_{f,n}=\tilde{\Delta}f_{f,n-1}+\tilde{\Delta}f_{fe,n}$$

The speaker/microphone clock frequency difference estimation $\tilde{\Delta}f_f$ may be written to memory 685 after, for example, a call, and read from memory at the beginning of a next call. If the estimated frequency difference $\tilde{\Delta}f_{fe}$ is below a predefined threshold for a predefined time period, the speaker/microphone clock frequency difference estimation $\tilde{\Delta}f_f$ is claimed as valid.

Once there is a valid speaker/microphone clock frequency difference estimation, when fine frequency difference estimation value is bigger than a predefined threshold $D_f$, then new estimation may be capped as $D_f$. Re-sampler 346 may calculate a sampling phase from the fine estimated frequency difference. $\emptyset_{n+1}=\emptyset_n+\tilde{\Delta}f_f$, where $\emptyset_n$ is the sampling phase at time n, and $\tilde{\Delta}f_f$ is the estimated speaker/microphone clock frequency. Re-sampler 346 may use a farrow structure for arbitrary phase interpolation. When $\emptyset_n>1$, re-sampler 346 may drop one input sample, and adjust $\emptyset_n$ to be $\emptyset_n=\emptyset_n-1$; if $\emptyset_n<0$, re-sampler may repeat one input sample, and adjust $\emptyset_n$ to be $\emptyset_n=\emptyset_n+1$.

After the fine frequency difference is determined in stage 930, method 900 may proceed to stage 940 where a fine frequency adjustment may be performed to reduce the determined fine frequency difference. Once the fine frequency adjustment is performed in stage 940, method 900 may then end at stage 950.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining, by an acoustic echo canceller, a coarse frequency difference between a first clock and a second clock, wherein determining the coarse frequency difference comprises measuring a phase rotation between a first signal associated with the first clock and a second signal associated with the second clock at a predetermined frequency component;
   performing, by said acoustic echo canceller, a coarse frequency adjustment of at least one of the following: the first clock and the second clock to reduce the determined coarse frequency difference;
   determining, by said acoustic echo canceller, in response to performing the coarse frequency adjustment, a fine frequency difference between the first clock and the second clock, wherein determining the fine frequency difference comprises:
      determining, by said acoustic echo canceller, a frequency domain representation of adaptive filter coefficients after performing the coarse frequency adjustment, and
      determining, by said acoustic echo canceller, a phase rotation of the adaptive filter coefficients based on the determined frequency domain representation; and
   performing, by said acoustic echo canceller, a fine frequency adjustment to reduce the determined fine frequency difference.

2. The method of claim 1, further comprising converting an analog microphone signal from a microphone to a digital signal using an analog-to-digital converter driven by the first clock.

3. The method of claim 1, further comprising converting a digital speaker signal to an analog signal for a speaker using a digital-to-analog converter driven by the second clock.

4. The method of claim 1, wherein performing the coarse frequency adjustment comprises performing the coarse frequency adjustment on a microphone portion of an acoustic echo canceller (AEC) system.

5. The method of claim 4, wherein performing the coarse frequency adjustment comprises performing the coarse frequency adjustment wherein the acoustic echo canceller (AEC) system comprises the microphone portion and a speaker portion connected over a digital link.

6. The method of claim 4, wherein performing the coarse frequency adjustment comprises performing the coarse frequency adjustment wherein the acoustic echo canceller (AEC) system comprises the microphone portion and a speaker portion connected over a digital link, the second clock driving an analog-to-digital converter on the microphone portion.

7. The method of claim 4, wherein performing the coarse frequency adjustment comprises performing the coarse frequency adjustment wherein the acoustic echo canceller (AEC) system comprises the microphone portion and a speaker portion connected over a digital link, the second clock driving an analog-to-digital converter on the microphone portion and the first clock driving a digital-to-analog converter on the speaker portion.

8. The method of claim 1, wherein performing the coarse frequency adjustment comprises performing the coarse frequency adjustment on a speaker portion of an acoustic echo canceller (AEC) system.

9. The method of claim 8, wherein performing the coarse frequency adjustment comprises performing the coarse frequency adjustment wherein the acoustic echo canceller (AEC) system comprises the speaker portion and a microphone portion connected over a digital link.

10. The method of claim 8, wherein performing the coarse frequency adjustment comprises performing the coarse frequency adjustment wherein the acoustic echo canceller (AEC) system comprises the speaker portion and a microphone portion connected over a digital link, the first clock driving a digital-to-analog converter on the speaker portion.

11. The method of claim 8, wherein performing the coarse frequency adjustment comprises performing the coarse frequency adjustment wherein the acoustic echo canceller (AEC) system comprises the speaker portion and a microphone portion connected over a digital link, the first clock driving a digital-to-analog converter on the speaker portion and the second clock driving an analog-to-digital converter on the microphone portion.

12. The method of claim 1, wherein performing the fine frequency adjustment comprises performing the fine frequency adjustment on a microphone portion of an acoustic echo canceller (AEC) system.

13. The method of claim 12, wherein performing the fine frequency adjustment comprises performing the fine frequency adjustment wherein the acoustic echo canceller (AEC) system comprises the microphone portion and a speaker portion connected over a digital link.

14. The method of claim 12, wherein performing the fine frequency adjustment comprises performing the fine frequency adjustment wherein the acoustic echo canceller (AEC) system comprises the microphone portion and a speaker portion connected over a digital link, the second clock driving an analog-to-digital converter on the microphone portion.

15. The method of claim 12, wherein performing the fine frequency adjustment comprises performing the fine frequency adjustment wherein the acoustic echo canceller (AEC) system comprises the microphone portion and a speaker portion connected over a digital link, the second clock driving an analog-to-digital converter on the microphone portion and the first clock driving a digital-to-analog converter on the speaker portion.

16. The method of claim 1, wherein performing the fine frequency adjustment comprises performing the fine frequency adjustment on a speaker portion of an acoustic echo canceller (AEC) system.

17. The method of claim 16, wherein performing the fine frequency adjustment comprises performing the fine frequency adjustment wherein the acoustic echo canceller (AEC) system comprises the speaker portion and a microphone portion connected over a digital link.

18. The method of claim 16, wherein performing the fine frequency adjustment comprises performing the fine frequency adjustment wherein the acoustic echo canceller (AEC) system comprises the speaker portion and a microphone portion connected over a digital link, the first clock driving a digital-to-analog converter on the speaker portion.

19. The method of claim 16, wherein performing the fine frequency adjustment comprises performing the fine frequency adjustment wherein the acoustic echo canceller (AEC) system comprises the speaker portion and a microphone portion connected over a digital link, the first clock driving a digital-to-analog converter on the speaker portion and the second clock driving an analog-to-digital converter on the microphone portion.

20. The method of claim 1, wherein determining the coarse frequency difference between the first clock and the second clock comprises determining the coarse frequency difference between the first clock and the second clock wherein the first clock corresponds to a speaker.

21. The method of claim 1, wherein determining the coarse frequency difference between the first clock and the second clock comprises determining the coarse frequency difference between the first clock and the second clock wherein the second clock corresponds to a microphone.

22. The method of claim 1, wherein determining the fine frequency difference comprises using a re-sampler.

23. The method of claim 1, wherein performing the fine frequency adjustment comprises using a re-sampler.

24. An apparatus comprising:
a speaker portion having a first clock;
a digital link; and
a microphone portion having a second clock and being connected to the speaker portion over the digital link, the microphone portion comprising an acoustic echo canceller configured to;
  determine a coarse frequency difference between the first clock and the second clock, wherein determining the coarse frequency difference comprises measuring a phase rotation between a first signal associated with the first clock and a second signal associated with the second clock at a predetermined frequency component,
  perform a coarse frequency adjustment of at least one of the following: the first clock and the second clock to reduce the determined coarse frequency difference,
  determine, in response to performing the coarse frequency adjustment, a fine frequency difference between the first clock and the second clock, wherein the acoustic echo canceller being configured to determine the fine frequency difference comprises the acoustic echo canceller being configured to:
    determine a frequency domain representation of adaptive filter coefficients after the coarse frequency adjustment, and
    determine a phase rotation of the adaptive filter coefficients based on the frequency domain representation, and
  perform a fine frequency adjustment to reduce the determined fine frequency difference.

25. The apparatus of claim 24, wherein the speaker portion comprises a digital-to-analog converter driven by the first clock.

26. The apparatus of claim 24, wherein the microphone portion comprises an analog-to-digital converter driven by the second clock.

27. An apparatus comprising:
a microphone portion having a first clock;
a digital link; and
a speaker portion having a second clock and being connected to the microphone portion over the digital link, the speaker portion comprising an acoustic echo canceller configured to;
  determine a coarse frequency difference between the first clock and the second clock, wherein determining the coarse frequency difference comprises measuring a phase rotation between a first signal associated with the first clock and a second signal associated with the second clock at a predetermined frequency component,
  perform a coarse frequency adjustment of at least one of the following: the first clock and the second clock to reduce the determined coarse frequency difference,
  determine, in response to performing the coarse frequency adjustment, a fine frequency difference between the first clock and the second clock, wherein the acoustic echo canceller being configured to determine the fine frequency difference comprises the acoustic echo canceller being configured to:
    determine a frequency domain representation of adaptive filter coefficients after the coarse frequency adjustment, and
    determine a phase rotation of the adaptive filter coefficients based on the frequency domain representation, and perform a fine frequency adjustment to reduce the determined fine frequency difference.

28. The apparatus of claim 27, wherein the speaker portion comprises a digital-to-analog converter driven by the second clock.

29. The apparatus of claim 27, wherein the microphone portion comprises an analog-to-digital converter driven by the first clock.

* * * * *